United States Patent [19]

Cartalos et al.

[11] Patent Number: 5,301,753

[45] Date of Patent: Apr. 12, 1994

[54] USE OF SCLEROGLUCAN AS HIGH TEMPERATURE ADDITIVE FOR CEMENT SLURRIES

[75] Inventors: Ulysse Cartalos; Jacqueline Lecourtier; Alain Rivereau, all of Rueil Malmaison, France

[73] Assignee: Institut Du Petrole, Rueil Malmaison, France

[21] Appl. No.: 922,401

[22] Filed: Jul. 31, 1992

[30] Foreign Application Priority Data

Aug. 1, 1991 [FR] France .............................. 91 09939

[51] Int. Cl.⁵ .................... E21B 33/14; C04B 24/38; C04B 24/16; C04B 14/04
[52] U.S. Cl. ................................. 166/294; 106/209; 106/730
[58] Field of Search .............. 166/294, 292, 293, 273, 166/246; 106/730, 617, 674, 209

[56] References Cited

U.S. PATENT DOCUMENTS

| | | | |
|---|---|---|---|
| 4,457,372 | 7/1984 | Doster et al. | 166/274 |
| 4,462,836 | 7/1984 | Baker et al. | 106/92 |
| 4,718,491 | 1/1988 | Kholer et al. | 166/294 |
| 5,082,577 | 1/1992 | Kohler et al. | 252/8.551 |

FOREIGN PATENT DOCUMENTS

| | | |
|---|---|---|
| 0432770 | 6/1991 | European Pat. Off. |
| 0434544 | 6/1991 | European Pat. Off. |
| 2212489 | 7/1989 | United Kingdom |

*Primary Examiner*—Stephen J. Novosad
*Attorney, Agent, or Firm*—Millen, White, Zelano, & Branigan

[57] ABSTRACT

In the cementing of oil wells, gas wells, or geothermal wells, wherein, under appropriate conditions, a suitable drilling fluid is injected, then optionally a slug fluid and finally a composition comprising water, a cement, at least one viscosity-enhancing additive, optionally at least one retarding agent and optionally at least one silica characterized in that the viscosity-enhancing agent is a scleroglucan solution. It applies particularly to the high temperature cementing of wells.

23 Claims, 3 Drawing Sheets

USE OF SCLEROGLUCAN AS HIGH TEMPERATURE ADDITIVE FOR CEMENT SLURRIES

BACKGROUND OF THE INVENTION

This invention relates to the use of scleroglucan as a high temperature, viscosity-enhancing additive for cement slurries. It relates to any operation involving a cement slurry having a high viscosity at high temperatures (temperatures typically higher than 90° C.). It is applicable to the oil industry for the cementing of wells for the recovery of a gaseous and/or liquid fluid from a porous subterranean formation. It is also applicable to the cementing of geothermal wells.

More particularly, it is applicable to the placing of the cement in the annular space between the walls of a well and the casing. This imparts improved mechanical strength to the casing, on the one hand, and a perfect fluid-tight seal between the various zones of the porous formation, on the other hand. The placing of the cement is generally performed in the following manner: The cement is poured into the casing at the head of well and is then forced to the bottom so that it can be transferred to and rise into the annular space while flushing out a drilling fluid and optionally a slug fluid. The success of the cementing operation depends on the effective displacement of the drilling fluid by the cement. The efficiency of the displacement step increases as the heavier and more viscous the displacing fluid is than the displaced fluid.

While the density of the cement is an easily controllable property, it is not the same for the rheological properties. The latter can vary considerably under the harsh temperature and pressure conditions encountered in a well. It has been demonstrated that the rheological properties of the standard slurry formulations are not very sensitive to pressure but depend greatly on temperature.

Ordinary slurry viscosity-enhancing agents, such as certain high molecular weight polymers, such as cellulose derivatives, can provide considerable viscosity levels at ambient temperature. However, they lose their effect at temperatures on the order of 100° C. The main reason for this phenomenon is that these products are not sufficiently chemically stable in the presence of high contents of calcium and at high pH levels of the slurries.

The effect of temperature is much more pronounced for the cement than for the drilling fluid. From 25°-120° C., for example, the shear stress at a given shear rate can drop by a factor of 10 for the slurry, whereas for the drilling fluid, it diminishes by a factor of between 2-4. Thus, while at ambient temperature, it is possible to have slurries clearly thicker than the drilling fluid; at 120° C., the cement can become clearly less viscous. This can have serious consequences for the success of the cementing (non-homogeneous setting leading to partial or total loss of the fluid-tight seal).

SUMMARY OF THE INVENTION

One of the objects of this invention is to eliminate or ameliorate the above drawbacks by utilizing a new process and a novel composition.

Upon further study of the specification and appended claims, further objects and advantages of this invention will become apparent to those skilled in the art.

DETAILED DESCRIPTION

A particular embodiment of the invention relates to a process for cementing oil wells, gas wells, or geothermal wells, wherein a suitable drilling fluid is injected and, optionally, a slug fluid and finally a composition comprising water, a cement, at least one viscosity-enhancing agent, optionally at least one retarding agent, and optionally at least one silica, wherein said viscosity-enhancing agent is a scleroglucan solution.

It has been observed that the composition obtained exhibits excellent rheological properties within a very wide temperature range, for example, between 40°-250° C., and particularly within a range of high temperatures of 90°-200° C.

Scleroglucan, a known material solid by Sanofi, a subsidiary of ELF (France) (see WO 91/06606 and U.S. Pat. Nos. 4,599,180 and 4,718,491), is a non-ionic polysaccharide polymer produced by fermentation of carbohydrates from, for example, *Sclerotium Rolsii* fungus (ATCC 15206). This polymer is very rigid because of its triple helix molecular structure, which makes it possible to maintain its viscosity-enhancing ability at high temperatures.

According to a preferred embodiment of the invention, the content expressed by weight of scleroglucan in the injected composition is, in general, at least equal to 200 parts per million (ppm), for example, between 200-5000 ppm; advantageously, between 500-4000 ppm; and particularly, between 1200-3500 ppm.

According to another aspect of the invention, the composition injected into the well may comprise a retarding agent in a quantity of between 0-5% and advantageously between 0.5-4% to extend the setting time so that the cement will not set too quickly during the cementing of the well.

The specific choice of the formulation is determined by the drilling fluid used. Rheology graphs of the drilling fluids can often be interpreted by Bingham's Law:

$$\tau = \tau_0 + \mu_p \dot{\gamma},$$

where $\tau$ is shear stress; $\dot{\gamma}$, the shear rate; $\tau_0$, the stress threshold, and $\mu_p$, the plastic viscosity.

For drilling fluids that are not very viscous, for example, those wherein a graph of the rheology at 120° C. is located between that of a Bingham fluid with characteristics $\tau_0 = 1$ Pa and $\mu_p = 7$ mPa.s and a Bingham fluid with characteristics $\tau_0 = 3$ Pa and $\tau_p = 25$ mPa.s, the scleroglucan content in the composition can vary preferably from 500 ppm to 2000 ppm, and that of the retarding agent can vary from 1-4% by weight, for example, for the retarding agent HR13L, marketed by Halliburton, a mixture of lignosulfonates and sugar derivatives. On the other hand, for more viscous drilling fluids, for example, those manifesting a rheology graph located, at 120° C., between that of a Bingham fluid with characteristics $\tau_0 = 3$ Pa and $\tau_p = 25$ mPa.s and a Bingham fluid with characteristics $\tau_0 = 15$ Pa and $\tau_p = 45$ mPa.s, the formulation advantageously can comprise from 2000-4000 ppm of scleroglucan and from 1-3% by weight of a retarding agent such as HR13L.

Similar ranges of values are useful with other conventional retarding agents such as sulfonated polymers, cellulose derivatives, and lignin derivatives.

According to another preferred aspect of the process of the invention, the water-to-cement weight ratio is generally from 0.35 to 0.7 and especially from 0.4 to 0.6.

The cement used can comprise cements of the classes A, B, C, D, E, F, G, H, and J [defined by the American Petroleum Institute, Spec. 10: Materials and Testing for Well Cements, Section 2 (General)]. Excellent results have been obtained at temperatures reaching 200° C. with class G cements that contain, in addition to scleroglucan and an HR13L retarding agent, silica (S8, for example), which imparts improved mechanical strength to the sleeve formed.

According to another preferred aspect of the invention, the silica-to-cement weight ratio can vary from above 0 to 1 and preferably from 0.6 to 0.8.

It has been observed that the use of scleroglucan as a high temperature, viscosity-enhancing additive for cement slurries enables high viscosity levels to be maintained.

The slurry can be produced in the following way: First, the scleroglucan polymer according to the invention is dissolved in water. After homogenization, the solution is introduced into a mixer, for example, of the Waring blender type. The cement and, optionally, the silica are added, and the mixture is stirred at high speed for about 30 seconds and then at low speed for 20 minutes. The pumpability time of the slurries can be adjusted from between 3-8 hours by the addition of a suitable amount of conventional retarding agent, depending on the operating requirements.

The injection of the composition into the well to be cemented is performed according to conventional techniques: The composition is injected into the casing at a specific flow rate which forces a conventional slug fluid into the annular space between the casing and the drilled formation, this slug fluid, in turn, pushing the drilling fluid.

The range of pressures in said well during the injection of the composition is, in general, from 50–1500 bars and preferably from 100–1000 bars (1 bar = $10^5$ Pa).

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar the several views and wherein.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents, and publications, cited above and below, and of corresponding French Application 91/09.939, filed Aug. 1, 1991, are hereby incorporated by reference.

EXAMPLES

Example 1

A Fann 70 rheometer was used to plot the rheology graphs of the compositions according to the invention that were tested. This apparatus allows for measurement at a large range of pressures (up to 1400 bars) and temperatures (up to 260°). The fluid is sheared in a Couette geometry (coaxial cylinders, mobile outside cylinder). Angular velocity $\Omega$ imposed on the mobile part and torque C measured on the stationary part can be linked to a shear rate $\tau$ and stress $\tau$ on the wall of the stationary cylinder.

The drilling fluids and the cement slurries are fluids whose properties vary with time at a given shear rate. These thixotropic fluids can reach a state of stable structure when they are sheared for a certain period of time. During the tests, the sample is then sheared for several minutes at a given rotation speed, and the measurement is taken after stabilization.

The rheological measurements were made according to the following protocol: Once the rheometer is filled, the procedure is begun by plotting a rheology graph by increasing, then reducing, the rotation speed, at 25° C. and then at intermediate temperatures up to, for example, 160° C. The temperature is then maintained and the pressure is increased while repeating the process at intermediate pressure values. After plotting the rheology graph at 1400 bars (rise+fall), measurements are retaken by gradually lowering the pressure and, afterwards, the temperature. A good reproducibility, in general, is observed, which indicates, on the one hand, that the measurements correspond to a state of stable structure and, on the other hand, that the sample is not degraded.

Figure 1:
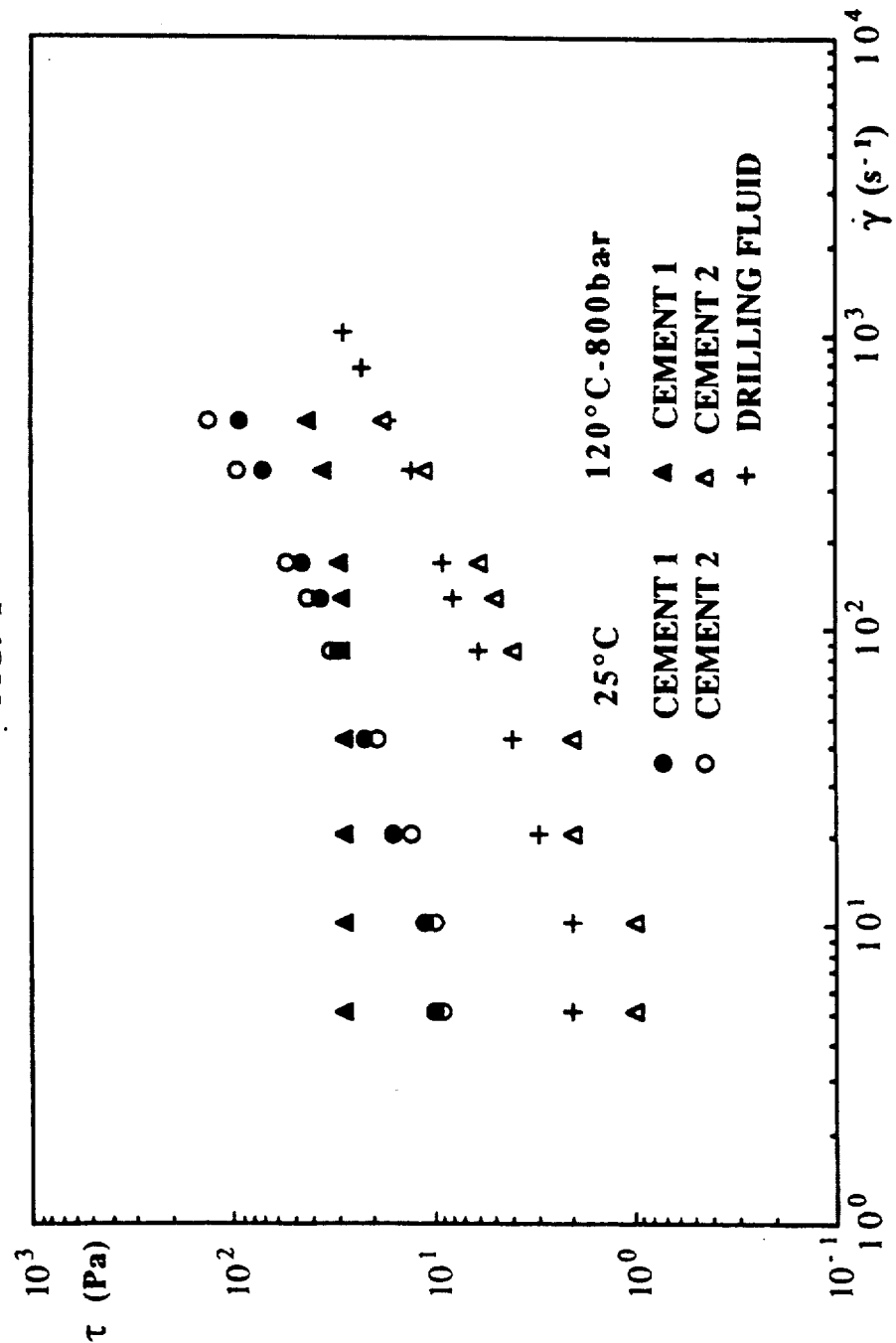
FIG. 1 compares the rheology graphs of the composition according to the invention and a composition according to the prior art.

The effect of the scleroglucan on the rheological properties of the slurry is shown in FIG. 1, where the rheology graphs of the composition according to the invention (cement 1) and a composition according to the prior art (cement 2) are compared. The compositions of cement 1 and cement 2 are provided in Table I.

TABLE I

| Cement 1 | | Cement 2 | |
|---|---|---|---|
| Origny G* | 1000 g (52%) | Origny G* | 1000 g (52%) |
| Silica S8 | 350 g (18%) | Silica S8 | 350 g (18%) |
| Water | 550 g (28%) | Water | 550 g (28%) |
| HR13L | 30 g (1.55%) | HR13L | 25 g (1.29%) |
| Scleroglucan | 2.75 g (1420 ppm) | Halad 22A** | 10 g (5170 ppm) |

*A dry, commercially available cement powder
**A commercial viscosity-enhancing agent Stress $\tau$, expressed in Pascals, is shown on the y-axis, while the shear rate $\tau$, at $s^{-1}$, is shown on the x-axis. The contents of viscosity-enhancing agents were selected so that at 25° C., the two slurries have comparable properties. The higher viscosity-enhancing ability of the scleroglucan is, therefore, noted, resulting in a savings to the process. It is clear that at 120° C. and under 800 bars, the conventional slurry (cement 2) loses its viscosity and becomes even less viscous than a drilling fluid used under these well conditions, whereas the slurry with scleroglucan (cement 1) remains sufficiently thick.

Example 2

Figure 2:
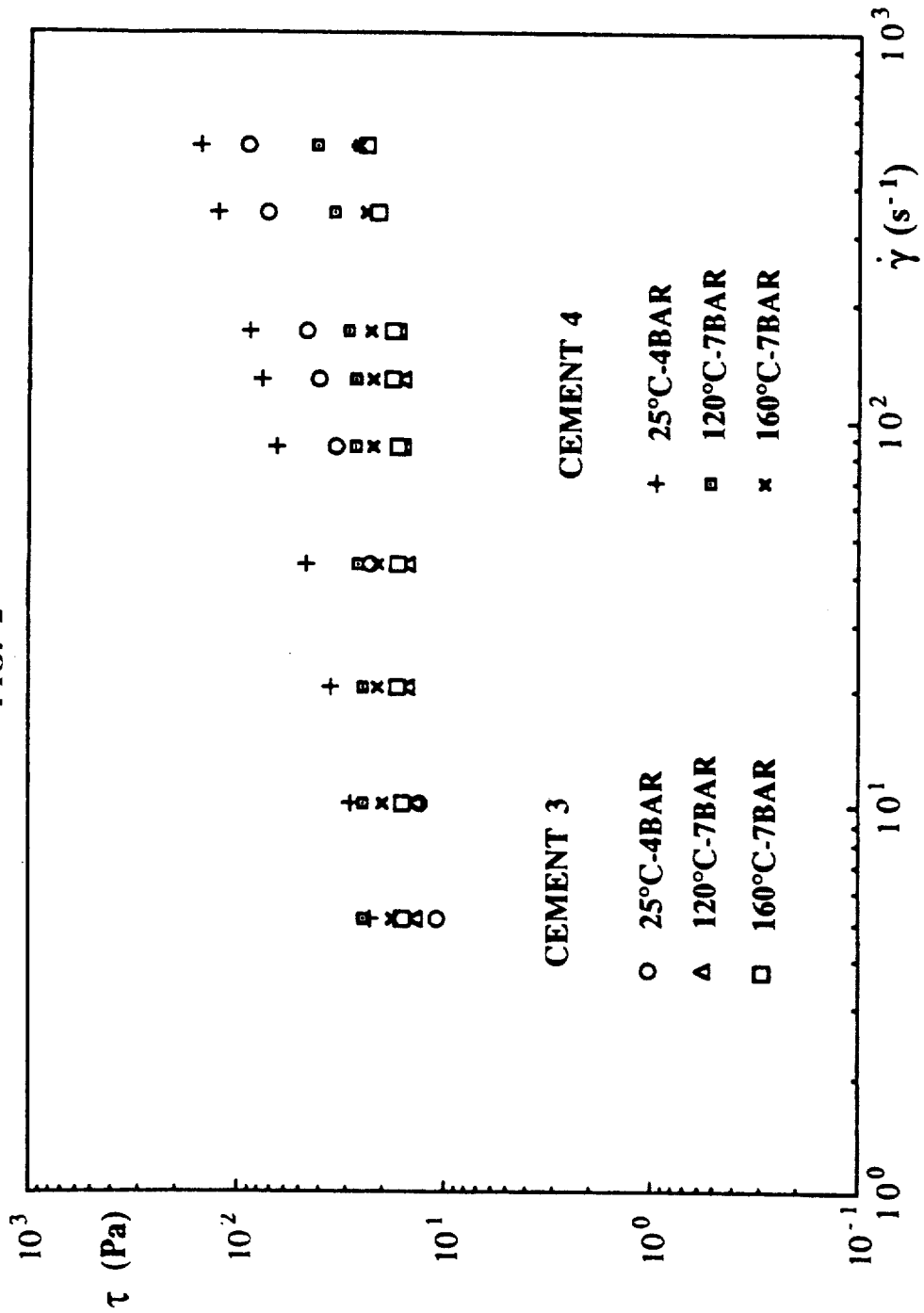
FIG. 2 illustrates the influence of temperature on different compositions according to the invention.

In FIG. 2, the pattern of the rheology graphs with temperature for two different concentrations of scleroglucan is shown. The two formulations tested have the same content of cement, silica, and water as cement 1 of Example 1. They contain 40 g of HR13L (2.06%) and their content of scleroglucan is:

Cement 3—2.75 g (1420 ppm)
Cement 4—4.00 g (2060 ppm).

Good rheological properties are obtained at temperatures as high as 160° C.

Example 3

Studies on class F and H slurries have been made under the same conditions as in Example 1. Cements 5 (class F) and 6 (class H), which are made viscous by scleroglucan (1420 ppm), have the same concentrations with regard to the other constituents as cement 1 of Example 1. The rheological properties at 160° C. of these cements are compared in Table II, on the one hand, with those of cements 5.1 and 6.1 of the same formulation but without scleroglucan and, on the other hand, with those of cements 5.2 and 6.2, which are made viscous with Halad 22A and whose other constituents are unchanged. This table shows the viscosity-enhancing ability of scleroglucan at temperatures as high as 160° C. for these two classes of cement.

TABLE II

| (a) Class F Cement | | | |
|---|---|---|---|
| Cement viscosity agent (ppm) $\dot{\gamma}$ (s$^{-1}$) | 5 scleroglucan 1420 $\tau$ (Pa) | 5.1 scleroglucan 0 $\tau$ (Pa) | 5.2 Halad 22A 5170 $\tau$ (Pa) |
| 85 | 7 | 0.7 | 1.0 |
| 170 | 7.5 | 0.9 | 1.3 |
| 340 | 9 | 1.5 | 1.8 |
| 510 | 13 | 2.4 | 2.9 |
| 1020 | 35 | 3.2 | 4.0 |
| (b) Class H Cement | | | |
| Cement viscosity agent (ppm) $\dot{\gamma}$ (s$^{-1}$) | 6 scleroglucan 1420 $\tau$ (Pa) | 6.1 scleroglucan 0 $\tau$ (Pa) | 6.2 Halad 22A 5170 $\tau$ (Pa) |
| 85 | 5 | | 0.9 |
| 170 | 6 | 0.7 | 1.2 |
| 340 | 7.5 | 1.0 | 1.5 |
| 510 | 10 | 1.5 | 2.6 |
| 1020 | 28 | 2.5 | 3.6 |

Example 4

Figure 3:
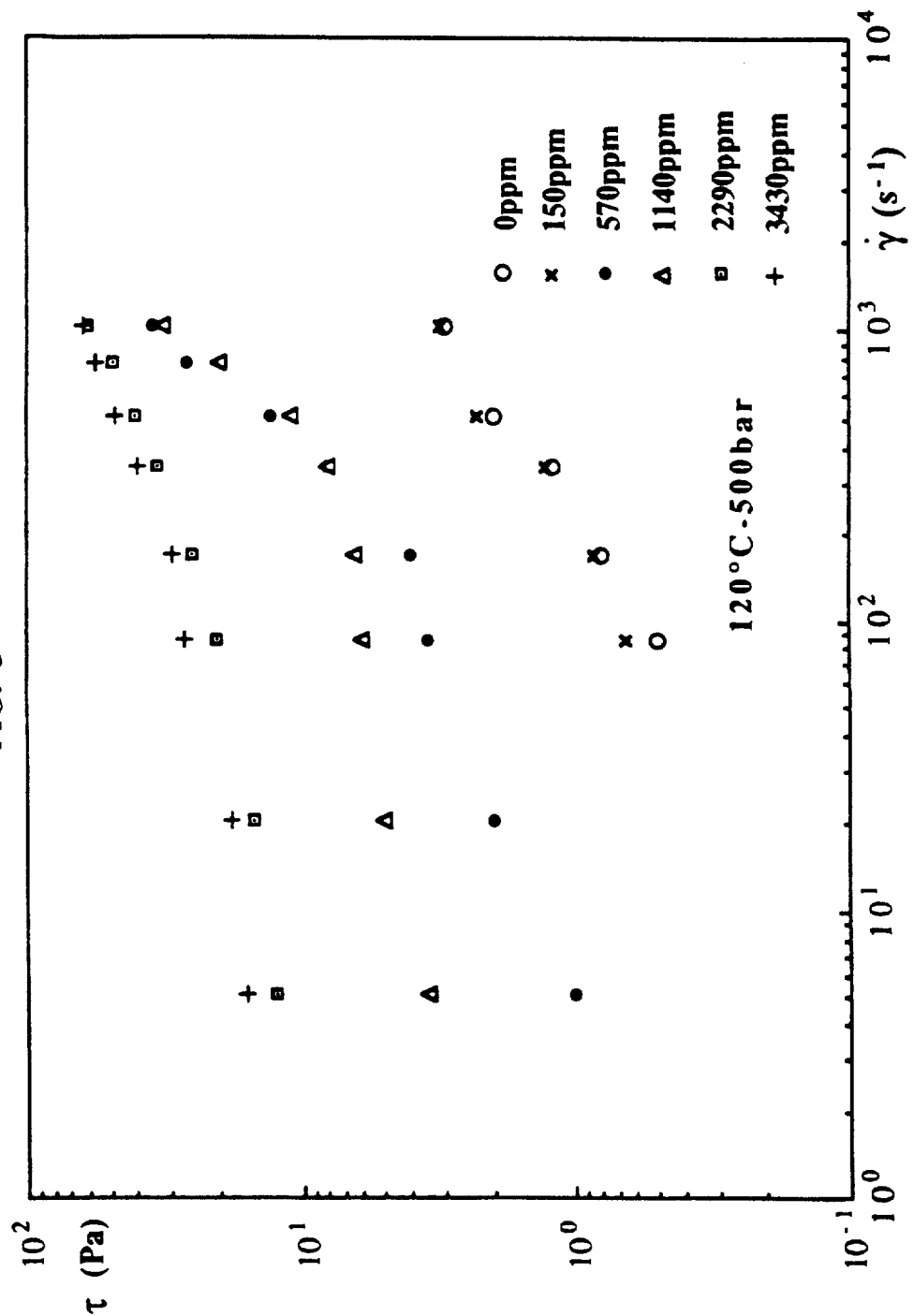
FIG. 3 is graphs of rheology as a function of the concentration of scleroglucan.

The pattern of the rheology graphs of the slurry formulations (same composition with regard to the other constituents as cement 1 of Example 1) with the content of scleroglucan (from 0-3430 ppm) is given in FIG. 3. This figure shows that at about 150 ppm, the content of scleroglucan is not sufficient to show clearly improved properties. It also shows that cements can be formulated for drilling fluids covering a wide variety of rheological properties.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process of cementing a well casing comprising injecting a drilling fluid into the well casing and thereafter injecting a composition comprising water, cement, and at least one viscosity-enhancing agent, the improvement wherein the viscosity-enhancing agent is scleroglucan having a content in the composition of 500-4000 ppm.

2. A process according to claim 1, wherein the content by weight of scleroglucan in the composition is 200-5000 ppm.

3. A process according to claim 1, wherein the content by weight of scleroglucan in the composition is 500-4000 ppm.

4. A process according to claim 1, wherein the content by weight of scleroglucan in the composition is 1200-3500 ppm.

5. A process according to claim 1, wherein said composition further comprises a retarding agent having a content of not more than 5% by weight.

6. A process according to claim 1, wherein said composition further comprises a retarding agent having a content of not more than 0.5-4% by weight.

7. A process according to claim 1, wherein the content by weight of scleroglucan in the composition is 500-2000 ppm and that of the retarding agent is 1-4%, when the drilling fluid has a rheology graph which is located, at 120° C., between the rheology graph of a Bingham fluid with characteristics $\tau_0 = 1$ Pa and $\mu_p = 7$ mPa.s and a Bingham fluid with characteristics $\tau_0 = 3$ Pa and $\mu_p = 25$ mPa.s.

8. A process according to claim 1, wherein the content by weight of scleroglucan is from 2000-4000 ppm and that of the retarding compound is from 1-3% when the drilling fluid has a rheology graph which is located, at 120° C., between the rheology graph of a Bingham fluid with characteristics $\tau_0 = 3$ Pa and $\mu_p = 25$ mPa.s and a Bingham fluid with characteristics $\tau_0 = 15$ Pa and $\mu_p = 45$ mPa.s.

9. A process according to claim 1, wherein the water-to-cement weight ratio is from 0.35 to 0.7.

10. A process according to claim 1, wherein the water-to-cement weight ratio is from 0.4 to 0.6.

11. A process according to claim 1, further comprising silica in a silica-to-cement weight ratio above 0-1.

12. A process according to claim 1, further comprising silica in a silica-to-cement weight ratio above 0.6-0.8.

13. A process according to claim 1, wherein the cementing temperature is from 40°-250° C.

14. A process according to claim 1, wherein the pressure in said well during the injection of the composition is from 50-1500 bars.

15. A process according to claim 1, wherein the pressure in said well during the injection of the composition is from 100-1000 bars.

16. A process according to claim 15, wherein the cementing temperature is from 90°-200° C.

17. A composition suitable for well casings, said composition consisting essentially of water, cement, and a viscosity-enhancing amount of scleroglucan as essentially and sole viscosity-enhancing agent and, optionally, silica and a retarding agent which is other than a cellulose derivative.

18. A composition according to claim 17, wherein the content by weight of scleroglucan is 200-5000 ppm.

19. A composition according to claim 18, wherein 0.5-4% by weight of said retarding agent is present in the composition.

20. A composition according to claim 17, wherein the retarding agent is present and is a mixture of lignosulfonates and sugar derivatives.

21. A composition according to claim 19, wherein the water-to-cement weight ratio is from 0.35 to 0.7.

22. A composition according to claim 21, wherein silica is present in the composition in a weight ratio to cement of from 0.6 to 0.8.

23. In a process of cementing a well casing comprising injecting a drilling fluid into the well casing and thereafter one viscosity-enhancing agent, the improvement wherein the viscosity-enhancing agent is scleroglucan and wherein the cementing is conducted at 90°-200° C., said scleroglucan being stable during said cementing.

* * * * *

UNITED STATES PATENT AND TRADEMARK OFFICE
CERTIFICATE OF CORRECTION

PATENT NO. : 5,301,753
DATED : April 12, 1994
INVENTOR(S) : Ulysse CARTALOS et al.

It is certified that error appears in the above-indentified patent and that said Letters Patent is hereby corrected as shown below:

Claim 2, Column 6, Line 11:
Delete "1" and insert --23--.

Claim 3, Column 6, Line 14:
Delete "1" and insert --23--.

Signed and Sealed this

Thirteenth Day of September, 1994

Attest:

BRUCE LEHMAN

Attesting Officer    Commissioner of Patents and Trademarks